United States Patent [19]

Park et al.

[11] Patent Number: 4,613,037
[45] Date of Patent: Sep. 23, 1986

[54] ROD-TYPE CONVEYOR BELT

[75] Inventors: David B. Park, Spring Grove; John A. Weaver, York; A. Scott Zumbrum, Jacobus, all of Pa.

[73] Assignee: Stewart Systems, Inc., Plano, Tex.

[21] Appl. No.: 754,183

[22] Filed: Jul. 9, 1985

Related U.S. Application Data

[63] Continuation of Ser. No. 465,446, Feb. 10, 1983, abandoned.

[51] Int. Cl.⁴ .............................................. B65G 21/18
[52] U.S. Cl. .................................... 198/778; 198/848
[58] Field of Search ...................... 198/848–853, 198/844, 839, 778, 436, 442, 841, 780, 458, 457, 456, 644, 459

[56] References Cited

U.S. PATENT DOCUMENTS

| 981,312 | 1/1911 | Robins . | |
|---|---|---|---|
| 2,149,776 | 3/1939 | Knoerzer | 198/848 |
| 2,942,722 | 6/1960 | Painter . | |
| 3,237,756 | 3/1966 | Pulver | 198/852 |
| 3,695,170 | 10/1972 | Ehrenberg . | |
| 3,856,133 | 12/1974 | Dyachkov . | |
| 3,918,774 | 11/1975 | Nicholson | 198/780 |
| 3,991,876 | 11/1976 | Schmidt, Sr. et al. | 198/848 |
| 4,036,352 | 7/1977 | White | 198/848 |

FOREIGN PATENT DOCUMENTS

| 848028 | 6/1952 | Fed. Rep. of Germany . |
| 3848028 | 9/1952 | Fed. Rep. of Germany . |

Primary Examiner—Joseph E. Valenza
Assistant Examiner—Kyle E. Shane
Attorney, Agent, or Firm—Michael A. O'Neil

[57] ABSTRACT

A longitudinally elongate conveyor belt is adapted for conveying a plurality of transversely spaced items. The belt comprises a plurality of interconnected, generally transversely extending rod members which are spaced apart along the longitudinal direction. Each rod member is upwardly arched to define first and second item-supporting segments. The first and second segments diverge in the downward direction so as to resist a tendency for the first and second items to be displaced by belt sag. An outer edge of the belt may be elevated relative to the inner edge to compensate for centrifugal forces.

5 Claims, 6 Drawing Figures

ROD-TYPE CONVEYOR BELT

CROSS-REFERENCE TO RELATED APPLICATIONS

This application is a continuation of Application Ser. No. 465,446, filed Feb. 10, 1983, now abandoned.

BACKGROUND AND OBJECTS OF THE INVENTION

The present invention relates generally to conveyor systems. More specifically, the present invention relates to a rod or grid-type conveyor belt.

Rod or grid-type conveyors comprise a series of longitudinally spaced, transversely extending rods which are interconnected at their ends as exemplified by commonly owned U.S. Pat. No. 4,036,352 issued to White on July 19, 1977. Endless conveyors of this type are used for the transportation of many goods or products, such as for cooling and proofing bakery goods, for example. The conveyor can be arranged in a double helix configuration in which the items travel upwardly along an outer helical flight and then downwardly along an inner helical flight, as disclosed in the above-mentioned White patent.

Rod-type conveyor belts are particularly useful in operations which utilize the circulation of air around the conveyed items, such as in the cooling of hot bakery goods, with the items being arranged side-by-side on the belt. However, such belts tend to sag under the weight of the conveyed items, which can result in a transverse sliding of the items. That is, when two items, such as two loaves of bread are disposed side-by-side on the belt, both loaves may have a tendency to converge towards the center of the belt as the belt sags. Such displacement can be undesirable in numerous respects. For example, certain items may become damaged upon being turned over or upon making contact with another item. Also, displacement of the items may interfere with the proper removal of the items. For example, a transfer system may be associated with the conveyor which removes one of the side-by-side items while re-cycling the other item. That is, the conveyor system may be such that the items on one side of the belt achieve a longer residence time in the conveyor system and are ready for removal while the items on the other side are to make another pass through the system. In that case, proper guidance of the items is made difficult if both items have shifted appreciably in the transverse direction. Heretofore, it has been necessary to provide a mechanism which senses the position of the items and attempts to displace one or both of the items back to a more suitable relationship, such as by a blast of air for example.

Another factor tending to displace the items on the belt is the effect of centrifugal forces created as the belt travels along a curved path.

It is one object of the present invention to overcome the above-enumerated problems.

Another object is to provide a rod-type conveyor belt which resists the tendency for side-by-side items to shift transversely.

A further object is to provide a rod-type conveyor belt which resists belt sag under the weight of the items being transported.

It is another object of the present invention to minimize item displacement caused by centrifugal forces.

SUMMARY OF THE INVENTION

These objects are achieved by the present invention which relates to a longitudinally elongate conveyor belt for conveying a plurality of items at least some of which are transversely spaced. The belt comprises a plurality of interconnected, generally transversely extending rod members which are spaced along the longitudinal direction. The rod members are generally stiff and each form an upper item-supporting surface. The surface is upwardly arched intermediate its ends to define a first item-supporting portion for supporting first items, and a second item-supporting portion for supporting second items in transversely spaced relation to the first items. The first and second surface portions diverge in the downward direction so as to resist a tendency for the first and second items to be displaced transversely by belt sag.

Preferably, each of the rod members each upwardly arched to define first and second transverse item-supporting segments.

An outer edge of the conveyor belt may be elevated relative to the inner edge to counteract the effects of centrifugal force as the belt traverses a curve.

THE DRAWING

The objects and advantages of the invention will become apparent from the following detailed description of the preferred embodiments thereof, in connection with. the accompanying drawings in which like numerals designate like elements, and in which.

DETAILED DESCRIPTION OF THE PREFERRED EMBODIMENTS

Figure 1:
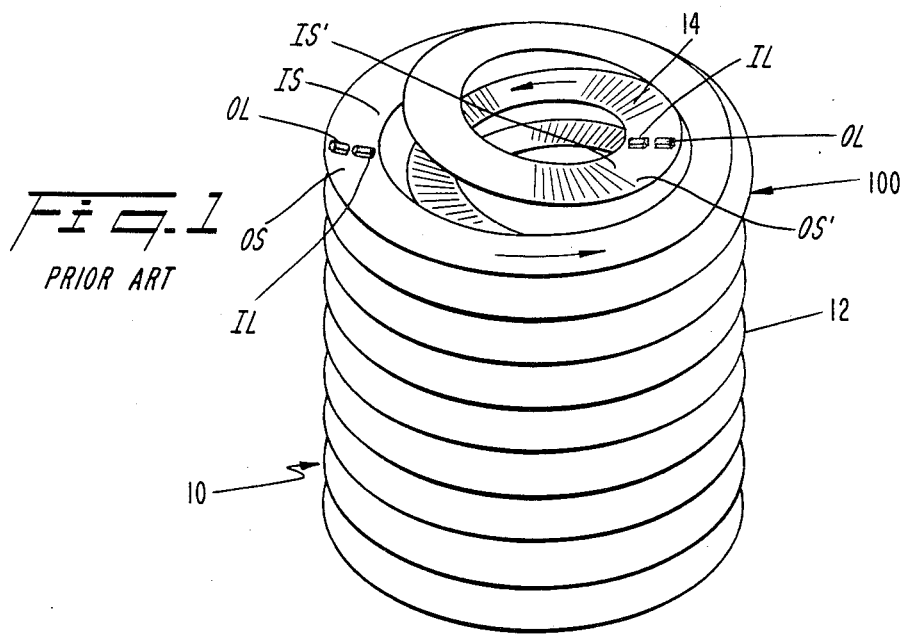
FIG. 1 is a perspective view of a double helix type conveyor belt.

With reference to FIG. 1, a preferred embodiment of the present invention includes a conveyor assembly 10 in which an endless rod-type conveyor belt 100 includes an outer upwardly moving helical conveyor flight 12 and an inner downwardly moving helical conveyor flight 14 which is surrounded by the outer flight 12. Thus, an item placed upon the conveyor belt 100 traverses a double helical path from an inlet portion of the outer flight 12 to an outlet portion of the inner flight 14.

Figure 2:
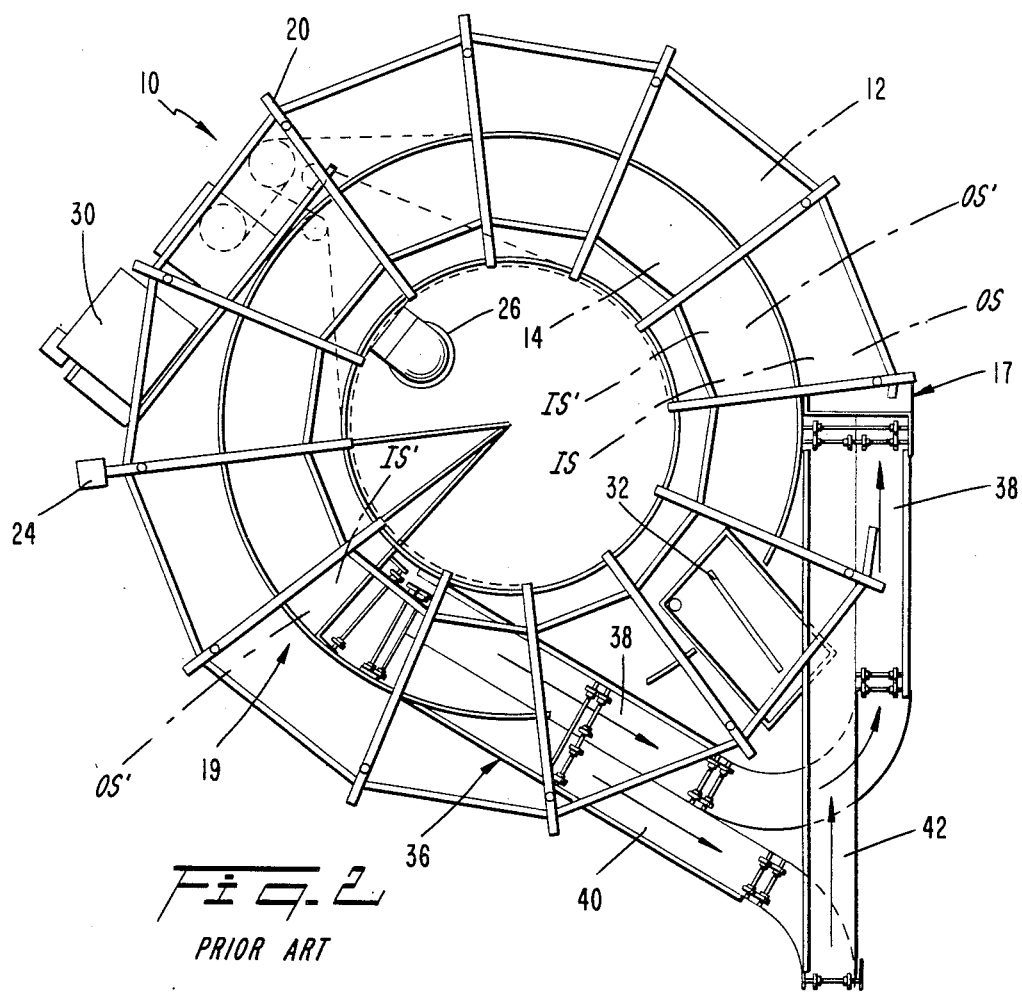
FIG. 2 is a top plan view of a skeletal framework on which a double helical conveyor belt is to be mounted, and depicting a transfer conveyor arrangement which receives and delivers items relative to the conveyor belt.

In FIG. 2 there is depicted, in top plan view, a skeletal framework for the belt 100, but with the belt 100 removed. Thus, the inlet area 17 for the outer flight and the outlet area 19 of the inner belt are clearly visible therein.

Double helical path endless conveyors are especially useful for transporting items which require an extended residence period on the conveyor, such as in the proofing and cooling of bakery goods. Of course, other types of items can be conveyed as well.

With reference again to FIG. 2, the skeletal framework 20 comprises a sufficiently rigid structure to support the conveyor belt. A plurality of conventional take-up weights 24 may be provided on the frame members 20 to tension the conveyor belt 100. A caged ladder 26 leading to a platform (not illustrated) may be installed inwardly of the frame members 20 to provide an observation area along the upper surface of the conveyor assembly 10.

The conveyor belt 100 may be driven in any conventional manner such as by means of a drive mechanism similar to that disclosed in the afore-mentioned U.S. Pat. No. 4,036,352 to White, the disclosure of which is incorporated herein by reference. Powering the conveyor drive mechanism is a suitable motor 30 which may have a variable speed drive.

A spray head 32 may be provided to clean debris such as food particles from the conveyor belt 100 after the items have been unloaded. A catch tank 35 is provided underneath the spray head 32 to receive the high pressure water and chemicals that are sprayed on the belt to clean the belt. This spraying process is done in the lower transition portion of the conveyor assembly 10 after the items such as baked goods have been unloaded from the conveyor belt 100.

Figure 3:
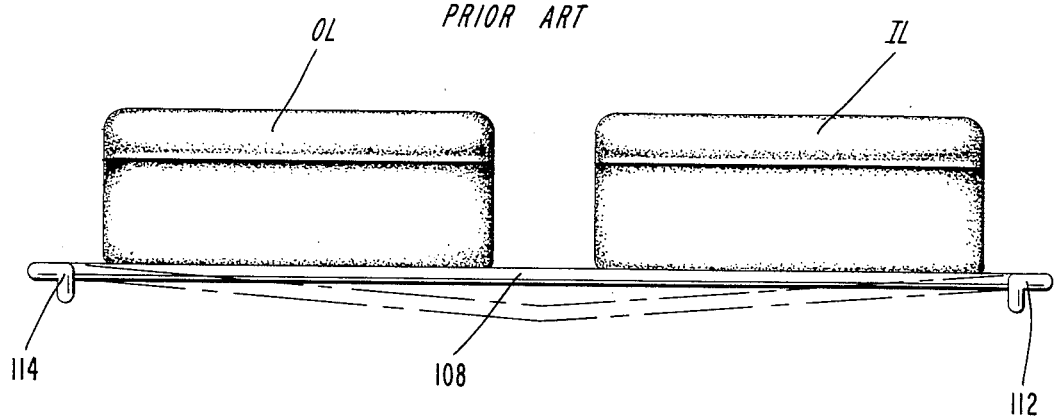
FIG. 3 is a front elevational view of a rod member of a rod-type conveyor belt, with broken lines depicting the manner in which the rod sags under the weight of items carried thereon.

The conveyor assembly 10 is especially useful in the conveying of items in side-by-side relationship, i.e., items which are transversely spaced on the belt, whether transversely aligned or not, such as the loaves of bread IL, OL depicted in FIGS. 1 and 3.

In order to remove and introduce the loaves relative to the conveyor belt 100, there is provided a transfer conveyor assembly 36. In FIG. 2, this transfer conveyor assembly is depicted in its proper orientation with the skeletal framework. Although the conveyor belt 100 is not depicted in FIG. 2, reference indicia IS, OS, IS', OS' have been inserted therein to indicate the location of various sections of the conveyor belt once installed as will be explained below.

The transfer conveyor assembly includes a first conveyor 42 upon which are transported the loaves that are to begin residence time on the conveyor assembly. This first conveyor 42 terminates at the inner side IS of the outer flight 12.

A second conveyor 38 communicates one side (e.g., an inner side IS') of the inner flight 14 with one side (e.g., an outer side OS) of the outer flight 12. A third conveyor 40 communicates with the other side (e.g., the outer side OS') of the inner flight 14 in order to remove from the outer side OS' of the inner flight 14 the loaves which have completed their residence time in the conveyor assembly.

Thus, a given loaf to be conveyed is (i) introduced via the first conveyor 42 onto the inner side IS of the outer flight 12, (ii) conveyed upwardly along the inner side IS of the outer flight 12 and then downwardly upon the inner side IS' of the inner flight 14, (iii) transferred via the second conveyor 38 to the outer side OS of the outer flight, (iv) conveyed upwardly along such outer side OS and then downwardly along the outer side OS' of the inner flight, and (v) removed from the latter by the third conveyor 40 and taken to another processing station.

The double helix conveyor assembly as described thusfar, including the transfer conveyor assembly 36, is conventional. As explained earlier, however, the rods 108 of the belt 100 may tend to sag under the weight of the loaves or other items being conveyed, as depicted in phantom lines in FIG. 3. In this regard, the conventional rod-type belt 100 (FIG. 3) comprises a plurality of stiff transverse rods 108, each rod being formed with first and second end links 112, 114 at the respective ends thereof. The first end links 112 of successive rods are interconnected, as are the second end links, to form the continuous belt 100. Heretofore, the rods 108 have comprised straight members upon which the side-by-side loaves OL, IL rested. As the rods tended to sag under the load, the loaves tended to converge toward the center of the sag. Such convergence could cause damage to the loaves and/or complicate efforts to deposit the loaves onto different conveyors at the outlet 19 of the inner flight 14.

Figure 4:
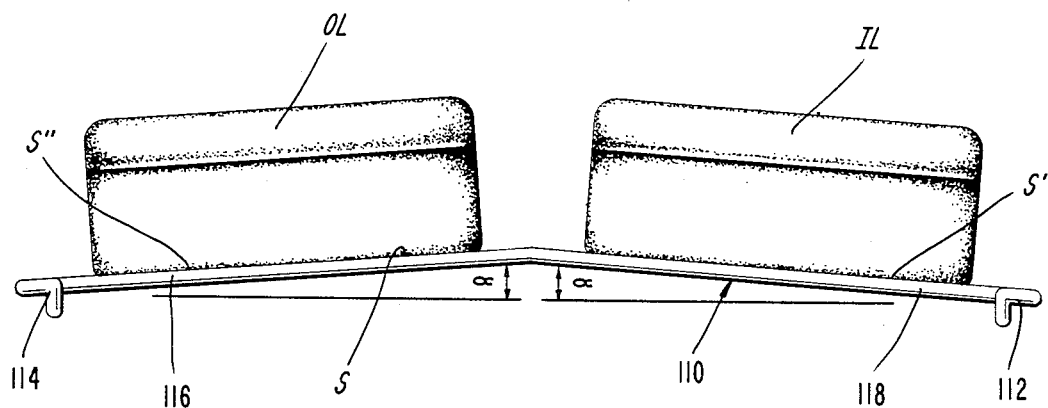
FIG. 4 is a front elevational view of a rod member of a conveyor belt according to the present invention.
Figure 5:
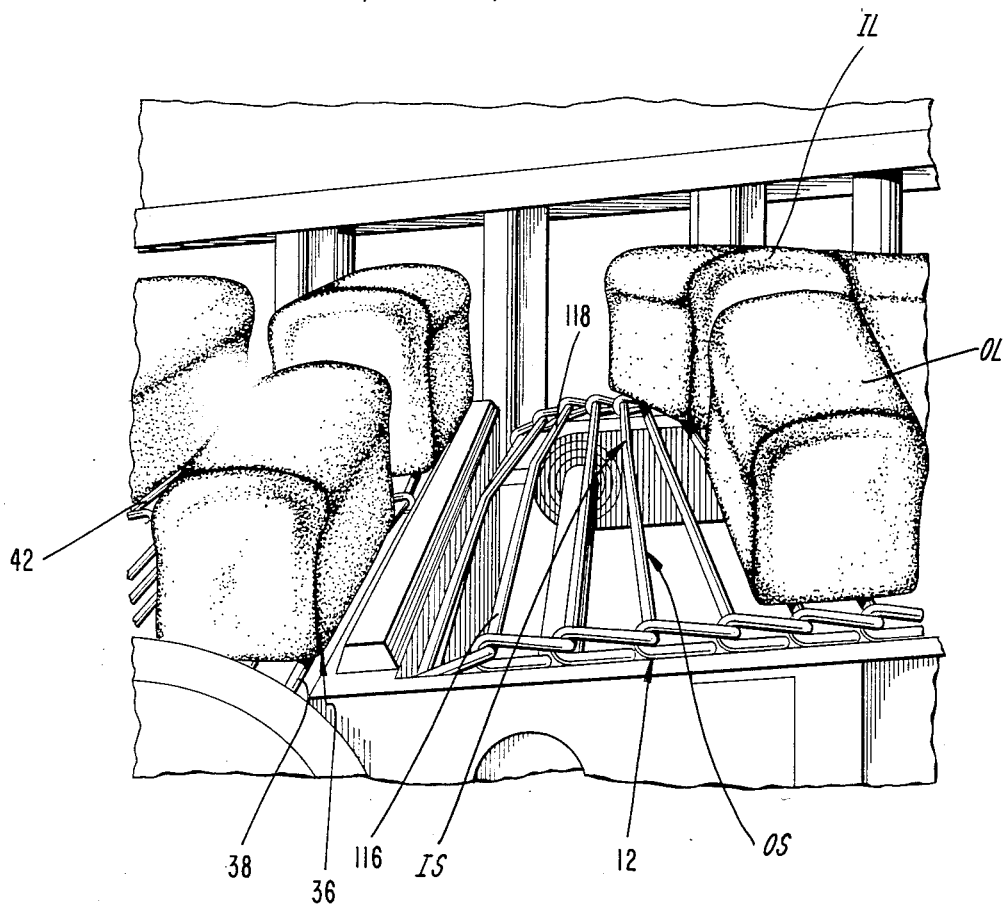
FIG. 5 is a perspective view of an inlet end of the conveyor belt according to the present invention as it receives transversely spaced items from the transfer conveyor arrangement.

In accordance with the present invention, each of the transverse rods 110 is bent upwardly at its middle to produce a cambered or arched upper surface S as depicted in FIGS. 4 and 5. The cambered rod thus defines two discrete item-support segments 116, 118 which, in turn, define discrete item supporting surfaces S', S''. The item support segments 116, 118 correspond respectively to the outer and inner sides of the inner and outer flights 12, 14. In FIG. 5, the first conveyor 42 is depicted as it delivers freshly baked loades to the inner segments 118 of the rods 110 of the outer flight 12, and the second conveyor 38 is depicted as it transfers partially cooled loaves (taken from the inner side IS' of the inner flight 14) to the outer segments 116 of the rods 110 of the outer flight 12.

With reference now again to FIG. 4, the first and second item-supporting segments 116, 118 are distinctly angled with respect to each other and also with respect to the horizontal. That is to say, the rod 110 is cambered to a particular angle (alpha) with both item-support segments lying at the same angle to the horizontal. Of course, it would also be possible to orient the two item-support segments at different angles to the horizontal if so desired.

The camber produced in the rods is to be sufficient to compensate for sagging of the rods under loading, to the extent necessary to prevent the loaves or other items from converging to any appreciable degree.

Preferably, each rod is at least 24-inches in length and has a central rise of from ¼ to ¾-inches to form a camber angle of from approximately 0.8 to 3.6 degrees.

In one preferred embodiment, a rod 110 was formed with a 36-inch length and ⅜-inch rise at the center of the rod. This provides a camber angle (i.e., an angle to the horizontal) of approximately 1.2 degrees. The rod camber may be greater or less, as deemed necessary.

With a plurality of cambered 36-inch long rods 110, two loaves of bread OL, IL may be placed transversely side-by-side on the two item-supporting segments 116, 118 of the rods 110 (see FIG. 4). The weight of the loaves will remove some of the camber from the rods 110. Preferably, however, some of the camber will still remain even when the belt is under loading.

Figure 6:
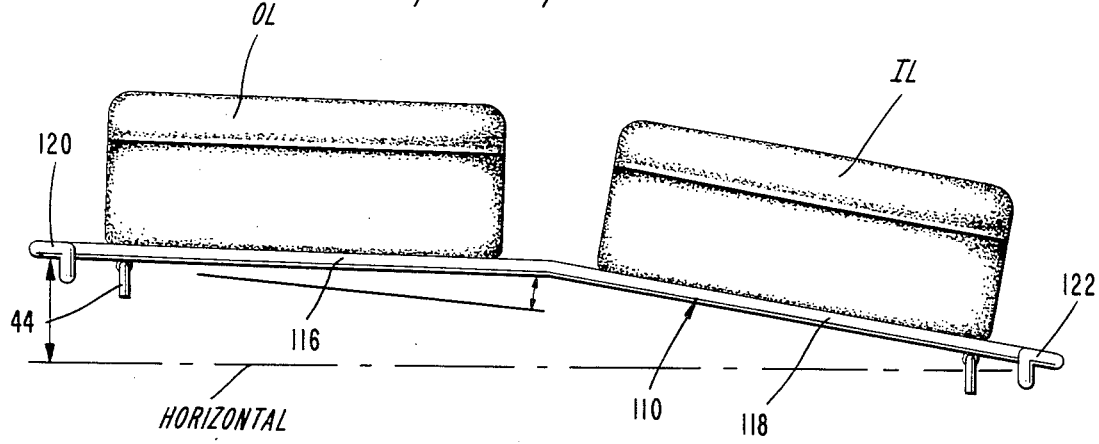
FIG. 6 is a view similar to FIG. 4, depicting the case in which the outer edge of the conveyor belt is elevated relative to the inner edge to compensate for centrifugal force.

In addition to cambering the rods 110, it is also possible, in accordance with the present invention to raise the outside edge 120 of the belt relative to the inside edge 122, as depicted in FIG. 6, so that the belt is tilted inwardly towards its center of rotation in the helical path. Such a tilting is useful to compensate for centrifugal forces acting on the loaves which may tend to displace both loaves towards the outside of the conveyor belt 100. The raising of the outer edge 120 of the belt can be achieved by adjusting the support rails 44 on which the outside edge of the conveyor belt 100 travels. Generally speaking, the raising of the outer edge 120 of the belt would be useful only in cases where the belt speed is high enough to generate sufficient centrifugal force to displace the loaves or other items by an appreciable amount.

It will be appreciated that the conveyor belt according to the present invention greatly minimizes the chances for damage or malfunctions to occur in cases where items are being conveyed in transversley spaced relationship. That is, by cambering the rods of the conveyor belt, any tendency for the rods to sag under the weight of the items is compensated for. Therefore, the items will not tend to converge toward the center of the belt. In cases where the transversely spaced items are to be segregated at a conveyor discharge zone, then, the items will remain in proper transversely spaced relationship to facilitate such segregation. In cases where the transversely spaced items are also transversely aligned, the items will not come into contact at the center of the belt. This is especially important when the items are of the type which could become damaged if coming into mutual contact.

The elevating of one edge of the belt relative to the other side further militates against transverse displacement of the items as induced by centrifugal forces when the conveyor belt traverses a curve.

Although the present invention has been described in connection with the preferred embodiments thereof, it will be appreciated by those skilled in the art that modifications, substitutions, deletions, and additions may be made without departing from the spirit and scope of the invention as defined in the appended claims.

What is claimed is:

1. A longitudinally elongate conveyor belt for conveying a plurality of items at least some of which are transversely spaced, said belt comprising a plurality of interconnected, generally transversely extending rod members which are spaced apart along the longitudinal direction to define air circulation spaces therebetween, link means at the ends of said rods each being looped around an adjacent rod to interconnect the rods, said rod members each being upwardly arched intermediate its ends to define a first transverse item-supporting segment for supporting first items and a second transverse item-supporting segment for supporting second items in transversely spaced relation to said first items, said first and second segements diverging in the downward direction so as to resist a tendency for the first and second items to be displaced against one another, said rods being arched to an extent which only partially compensates for the weight of said first and second items whereby said rods remain arched with said first and second items seated thereon.

2. A conveyor belt according to claim 1, wherein each of said rod members is at least 24-inches in length and has a central rise of from ¼ to ¾-inches to form a camber angle of from approximately 0.8 to 3.6 degrees when not loaded.

3. A conveyor assembly for conveying assembly of conveying a plurlaity of items at least some of which being transversely spaced, said conveyor assembly comprising a frame work and a conveyor belt mounted thereon, said belt comprising a plurality of interconnected, generally transversely extending rod members which are spaced apart along the longitudinal direction to define air circulation spaces therbbetween, link means at the ends of said rods each being looped around an adjacent rod to interconnect the rods, said rod members each being upwardly arched intermediate its ends to define a first transverse item-supporting segment for supporting first items and a second transverse item-supporting segment for supporting second items in transversely spaced relation to said first items, said first and second segments diverging in the downward direction to resist a tendency for said first and second items to be displaced transversely against one another, said rods being arched to an extent which only partially compensates for the weight of said first and second items whereby said rods remain arched with said first and second items seated thereon.

4. A conveyor assembly according to claim 3, wherein an outer edge of said belt is elevated relative to an inner edge of said belt at least in areas where said belt traverses a curve, in order to compensate for centrifugal forces.

5. A conveyor assembly according to claim 3, wherein said belt is arranged in a double helix pattern.

* * * * *